United States Patent Office 3,403,478
Patented Oct. 1, 1968

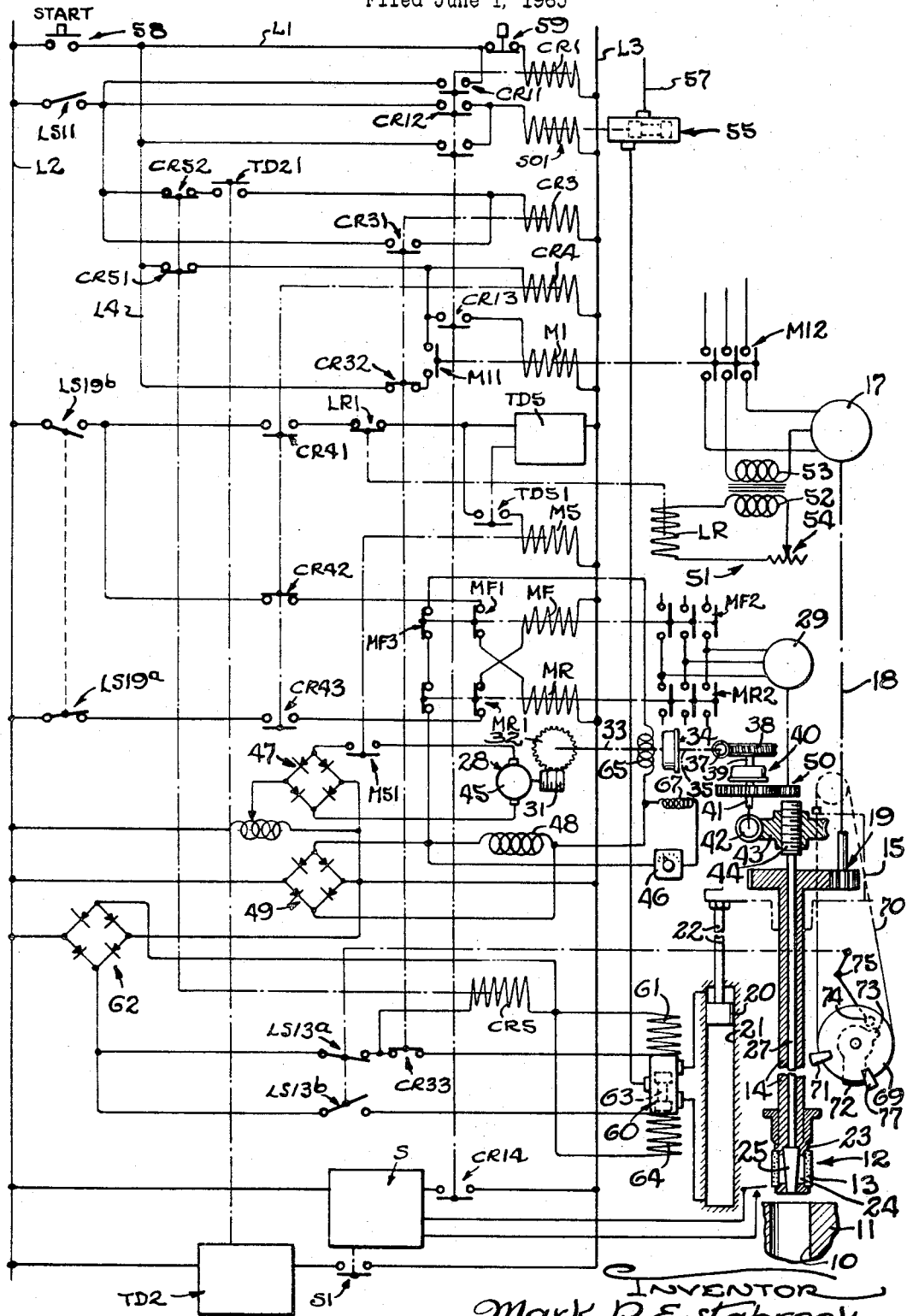

3,403,478
AUTOMATIC FEED CONTROL FOR ABRADING MACHINE
Mark R. Estabrook, Rockford, Ill., assignor to Barnes Drill Co., Rockford, Ill., a corporation of Illinois
Filed June 1, 1965, Ser. No. 460,055
3 Claims. (Cl. 51—34)

ABSTRACT OF THE DISCLOSURE

A machine for honing the bore of a workpiece by reciprocating a honing tool along the bore and simultaneously rotating the tool with abrading elements thereon pressed against the bore wall. The tool is carried on the lower end of the spindle journaled in a reciprocating head and rotated by an electric motor, and the honing elements are fed radially outwardly at a preselected rate by feed mechanism including a cam, reduction gearing, and two electric motors for driving the feed mechanism and expanding the tool at traverse and feed rates. To control the working pressure developed between the honing elements and the work, a current-responsive meter relay senses the current flowing through the spindle motor and opens a control switch when the current reaches a preselected level. This switch interrupts operation of the feed mechanism until after the current has dropped, indicating that the working pressure again is below the predetermined desired level. A timer disables the motor for a timed interval after each opening of the switch to prevent fluttering of the relay under transient conditions.

---

This invention relates to the control of automatic abrading machines and, more particularly, to the control of tool expansion in an automatic honing machine for enlarging and finishing work bores. In such machines, an expandable honing tool is reciprocated along a work bore and simultaneously rotated within the bore as abrasive elements or stones on the tool are fed gradually outwardly to maintain the abrading pressure between the stones and the wall as the latter wears away.

The general object of the present invention is to provide a new and improved control for limiting the pressure developed between the stones and the wall and thereby protecting the stones from the excessive wear that results when excessive pressure is developed.

A more specific object is to sense the load on the stones by measuring the current drawn by the electric motor for rotating the tool, and to control the operation of the expansion mechanism in response to variations in the motor current.

Another object is to eliminate the momentary loss of driving torque that has been a problem with slip clutches for limiting working pressure.

Other objects and advantages of the invention will become apparent from the following detailed description taken in connection with the accompanying drawing, in which the single figure is a schematic view, shown partially in cross-section, of the basic parts of an automatic honing machine together with a diagram of the control circuits embodying the novel features of the present invention.

As shown in the drawing for purposes of illustration, the invention is embodied in a control for a machine for honing the bore wall 10 of a workpiece 11 by reciprocating a honing tool 12 along the bore and simultaneously rotating the tool with abrading elements 13 thereon pressed against the bore wall. In this instance, the tool is carried on the lower end of a spindle 14 journaled in and projecting downwardly from a head 15 supported on the machine base (not shown) for vertical reciprocation. The spindle is rotated during such reciprocation by an electric motor 17 connected to the spindle by a shaft 18 and gearing 19. Raising and lowering of the head to reciprocate the tool is effected by a reciprocating hydraulic actuator comprising a piston 20 fitted and guided in a vertical cylinder 21 on the machine base, the piston being connected to the head by a rod 22 extending upwardly from the piston through the upper end of the cylinder.

The honing tool 12 is of a conventional type comprising an annular series of abrasive stones 13 disposed in and projecting outwardly through elongated slots angularly spaced around the hollow cylindrical body 23 of the tool with followers 24 on the inner sides of the stones engaging a downwardly tapered conical cam 25 movably disposed inside the body. The cam is supported on the lower end of a rod 27 which extends upwardly through the spindle 14 and is part of the mechanism for expanding the tool. As the rod moves downwardly through the spindle, the cam 25 feeds the stones radially outwardly at a rate determined by the slope of the cam and the rate of downward movement of the expander rod 27.

While the mechanism for moving the expander rod 27 and thereby feeding the stones 13 outwardly into the bore wall 10 may take various well-known forms, herein it comprises two electric motors 28 and 29 that customarily are mounted on the head 15 and drivingly connected through suitable reduction gearing to a nut-and-screw mechanism for converting the rotary motion of the motors into endwise motion of the expander rod. For this purpose, a worm 31 on the shaft of the feed motor 28 meshes with a worm wheel 32 on a shaft 33 coupled by a feed clutch 34 to a shaft 35 carrying a worm 37 meshing with a worm wheel 38 on the end of a perpendicular shaft 39. This shaft is coupled by a slip-friction safety clutch 40 to another shaft 41 which carries a worm 42 meshing with a worm wheel 43 that is threaded internally onto a screw 44 movable with the expander rod. When both clutches 34 and 40 are engaged and the feed motor is operating, the expander rod is moved at a relatively slow rate used to feed the stones slowly into the work during honing. The feed motor preferably is a variable speed DC motor having an armature 45 adapted to be energized by DC current supplied by a rectifier 47 while the motor field 48 is energized by current supplied by a second rectifier 49.

The motor 29 is geared directly to the shaft 41 as shown at 50 and is a reversible AC motor for moving the expander rod 27 at a relatively rapid, so-called traverse rate used to bring the stones 13 rapidly into positions close to or against the bore wall 10 preparatory to the honing operation, and to collapse the tool at the end of the operation. During operation of the traverse motor, the clutch 34 is disengaged to uncouple the feed motor 28, and during slow feeding of the stones, the deenergized traverse motor turns idly with the shaft 41.

It will be seen that the safety clutch 40 limits the maximum torque that can be transmitted from the feed motors to the nut-and-screw mechanism 43, 44 and thus limits the working pressure that can be exerted by the stones 13 on the bore wall 10. To permit adjustment of the maximum working pressure, the degree of energization of the safety clutch usually is made adjustable, for example, by a potentiometer 46 for selectively varying the holding friction of the clutch. In service use, however, it has been found that varying conditions affect the holding friction and, further, that the holding friction drops sharply from the selected value once the clutch starts to slip, resulting in a temporary and undesirable loss of the desired working pressure.

In accordance with the present invention, the working pressure is controlled in a wholly different and more precise way by sensing the load on the spindle motor 17, this being an accurate indication of the resistance to turning of the tool 12 and thus of pressure between the stones 13 and the bore wall 12, and controlling the feed motor 28 in accordance with the spindle motor load to maintain the working pressure below a predetermined value. To this end, the control for the machine includes a device 51 for sensing the current drawn by the spindle motor 17 and thereby measuring the load on the motor, and means operated by the sensing device and controlling the operation of the feed motor 28.

In this instance, the sensing device 51 includes a current responsive meter relay LR of well-known construction connected across the output winding 52 of a current transformer having an input winding 53 in series with the spindle motor so that the transformer is energized by the current flowing through the spindle motor. A rheostat 54 adjusts the impedance in series with the sensitive relay and thus varies the current through the relay produced by a given current through the spindle motor and the input winding of the transformer. With this arrangement, the rheostat may be set for actuation of the relay LR and operation of its normally closed switch LR1 at any selected motor current level corresponding to a predetermined working pressure on the stones 13. The operation of the relay switch controls the operation of the feed motor 28 to hold the honing pressure within a preselected range. The relay LR may be of the type sold by Assembly Products, Inc. as Part No. 461–CRMR, AC Meter Relay.

*Control circuits and automatic operation*

During the automatic cycle of the honing machine, the operation of the various power actuators is controlled by the circuits shown in the drawing, all relays being shown in the deenergized condition. After a cycle has been completed, the control circuits are conditioned as shown with the spindle drive motor 17 stopped and the supply of pressure fluid to the hydraulic cylinder 21 interrupted by a solenoid valve 55 in a supply line 57 leading to the hydraulic pump (not shown). Both hone expansion motors 28 and 29 are deenergized, the feed clutch 34 is disengaged, and the honing tool 12 is collapsed and withdrawn from the workpiece 11.

To start the automatic cycle, the operator manually closes a start switch 58 which completes a circuit through a line L1 and a normally closed stop switch 59 to a relay CR1 across two electric power lines L2 and L3 connected to a suitable power source (not shown). Relay CR1 closes its switch CR11 to prepare a holding circuit around the start switch, and also closes its switch CR12 in the circuit of a solenoid SOL to open the valve 55 and admit pressure fluid into the supply line 57 leading to a reciprocation control valve 60. The control valve "down" coil 61 is energized by current supplied by a rectifier 62 through presently closed switches LS13ª and CR33, and thus shifts the spool 63 of the control valve upwardly to admit pressure fluid from the supply line into the upper or rod end of the reciprocation cylinder 21. This starts the head 15 down to shift the honing tool 12 into the bore 10. The "up" coil 64 of the control valve is deenergized by switch LS13ᵇ which is open whenever its companion switch LS13ª is closed. At the same time, switch CR13 closes to energize a relay M1 which closes its switches M12 to start the spindle motor 17, and switch CR14 closes to energize a sizing device S for eventually signaling the attainment of the desired bore size in a well-known manner. As the head 15 begins to move downwardly from its retracted position, a switch LS11 closes to complete holding circuits around the start switch 58. This switch then remains closed until the head again is retracted at the end of the automatic cycle.

Closing of the start switch 58 also completes a circuit through line L4 and a normally closed switch CR51 to energize a relay CR4 which closes its switch CR43 and completes a circuit through closed switches LS19ª and MR1 to a relay MF whose switches MF2 close in the forward circuits of the traverse motor 29. A switch CR41 closes idly in the circuit of a timer TD5 while switches CR42 and MF1 open in the circuit of a relay MR controlling reverse operation of the traverse motor. At this point, a switch M51 in the armature circuit of the feed motor 29 is open and a switch MF3 in the DC circuit of the winding 65 of the feed clutch 34 is open to disengage the feed clutch. The winding 67 of safety clutch 40, however, is in a completed circuit including the rectifier 49 and is energized to couple the traverse motor to the nut 43 for moving the expander rod 27. This winding remains energized throughout the honing cycle to the degree selected by the potentiometer 46.

Accordingly, rapid expansion of the honing tool 12 is started as the tool moves downwardly through the work bore 10. Rapid expansion is terminated in any well-known manner, for example, in the manner disclosed in Patent No. 2,780,893. For purposes of simplification, the present control is shown as terminating rapid expansion by opening of a switch LS19ª in the circuit of relay MF to de-energize the relay, opening its switches MF2 to stop the traverse motor and closing its switch MF3 to energize the feed clutch winding 65 and engage the clutch. Thus, the feed clutch acts as a brake on the traverse motor. The simultaneous closing of companion switch LS19ᵇ is used to initiate slow feeding of the stones by completing a circuit to the timer TD5 through switch CR41. When the timer times out after the preselected delay, it closes switch TD51 to energize a relay M5 which closes switch M51 to complete the DC circuit through the rectifier 47 and the feed motor armature 45. Thus, the feed motor 28 begins to expand the tool 12 at the slower rate.

Control of the reciprocation valve 60 also is effected in a well-known manner, for example, by a dial or disk 69 that is journaled on the machine frame and rocked back and forth about its axis by a connection 70 with the head 15, as shown and described generally in the aforesaid patent. During the forward or downward stroke of the head, switch LS13ª remains closed to maintain the energization of the "down" coil 61 of the valve. As the tool approaches the lower end of the work bore with the disk turning counterclockwise, a dog 71 on the disk 69 engages an arm 72 journaled on the frame with the disk and releasably held in place by friction. The lug 71 shifts the arm counterclockwise about the disk axis so that a lug 73 on the hub of the arm engages a follower 74 to cam the follower outwardly about its pivot 75 and reverse the condition of the switches LS13ª and LS13ᵇ. This completes a circuit to the "up" coil 64 to shift the valve spool 63 downwardly and begin delivering fluid to the head end of the cylinder 21. Thus, the head starts back up, turning the control disk clockwise until a dog 77 on the disk engages the opposite side of the arm 72, moves the latter away from the follower 74, and allows the follower to be returned to the position in the drawing, thereby reversing the switches LS13ª and LS13ᵇ to energize the coil 61 and deenergize the coil 64. Accordingly, the head reciprocates the tool back and forth along the bore under the control of the disk 69. The switch LS11 may be opened in the retracted position of the head 15 and closed during honing by suitable means (not shown) on the disk 69.

As honing progresses and the stones 13 are fed slowly into the bore wall 10, the current drawn by the spindle motor 17 is a direct measure of the frictional resistance to turning of the tool 12 within the bore and thus an indication of the honing pressure between the wall and the stones. If, due to the changing condition of the bore wall and the rate of expansion of the tool, an overload condition occurs, the resistance to turning of the spindle 14 rises and the motor current correspondingly increases. When this level reaches the level selected by the rheostat 54 for operation of the meter relay LR, the latter opens its switch LR1 to deenergize the timer TD5 which resets itself and opens its switch TD51. This deenergizes relay M5 in the armature circuit of the feed motor 28 to stop the motor and thereby interrupt the feeding of the stones into the bore wall. Thus, the tool continues to reciprocate and rotate within the bore but without further expansion. As a result, the continued wearing away of the bore wall begins to relieve the pressure on the tool.

After the preselected time interval of a few seconds, timer TD5 times out and recloses switch TD51 to prepare the circuits for energization of the feed motor 28 when the spindle motor current falls below the value selected for operation of the relay LR, indicating that the honing pressure again is below the desired maximum. Then the switch LR1 closes to complete the circuit to relay M5 and start the feed motor again. It will be seen that the timer TD5 disables the circuit to relay M5 for a short interval after each opening of switch LR1 to prevent fluttering of the relay under transient conditions.

When the desired bore size is attained, switch S1 is closed by the sizing device S to energize a timer TD2 which times out after a few clean-up strokes of the hone and closes its switch TD21. This prepares a circuit for the energization of a relay CR3 through switch LS11 upon closure of a switch CR52. This switch is closed when relay CR5 is deenergized, that is, during each upstroke when switch LS13$^a$ is open. The head 15 completes a full down stroke after timer TD2 times out, switch LS13$^a$ opens at the bottom of the stroke to deenergize relay CR5 and close switch CR52, and this energizes relay CR3 which completes a holding circuit by closing switch CR31 and opens switch CR33 to disable the circuit to the "down" coil 61.

Thus, the head 15 continues upwardly from the top of its normal stroke to withdraw the tool 12 from the work bore 10. When the head reaches its fully retracted position, switch LS11 is opened to deenergize the circuits and return them to the condition shown in the drawing.

From the foregoing, it will be seen that the present invention provides a relatively simple but readily adjustable and accurate control for the maximum honing pressure that is developed by expansion of the hone within the bore 10. The current drawn by the spindle motor 17 is a precise measure of the resistance to turning of the tool within the bore, and this, in turn, is a direct indication of the honing pressure being exerted on the bore wall. With a current-responsive device 51 for sensing the motor current level and controlling the feed motor 28 in accordance with changes in the current level, the honing pressure is held within preselected safe limits throughout the cycle.

I claim as my invention:

1. In a honing machine, the combination of, an expandable tool having radially movable honing elements, mechanism supporting said tool for back and forth reciprocation along a bore wall to be honed and simultaneous rotation within the bore, an electric drive motor for rotating said tool during such reciprocation, feed mechanism for expanding said tool by feeding said elements outwardly into the bore wall, a selectively operable electric motor driving said feed mechanism to expand said tool, a device continuously sensing the current drawn by said tool rotating motor and thereby sensing the resistance to rotation of said elements in engagement with the bore wall, and means operated by said sensing device for stopping feeding of said elements whenever said current attains a predetermined value and restarting feeding after the current drops below said value.

2. In a honing machine, the combination of, an expandable tool having radially movable honing elements, mechanism supporting said tool for back and forth reciprocation along a bore wall to be honed and simultaneous rotation within the bore, an electric drive motor for rotating said tool during such reciprocation, feed mechanism for expanding said tool by feeding said elements outwardly into the bore wall, a selectively operable electric motor driving said feed mechanism to expand said tool, a device continuously sensing the current drawn by said tool rotating motor and thereby sensing the resistance to rotation of said elements in engagement with the bore wall, and means operated by said sensing device for stopping feeding of said elements after said current attains a predetermined value and restarting feeding after the current drops below said value, said means including a timer activated in response to attainment of said predetermined current value and operable to disable said motor driving said feed mechanism for a preselected time interval after attainment of said value thereby to stabilize said means under transient current conditions.

3. In an abrading machine, the combination of, a tool having a movable abrading element, mechanism for rotating said tool relative to a work surface to be abraded and including an electric drive motor, mechanism for feeding the rotating element into the work surface including a selectively operable feed motor, a device for sensing the current drawn by said tool rotating motor and thereby sensing the resistance to movement of said element along the work surface as the element is fed into the work surface, said sensing device comprising a current responsive relay activated in response to a preselected level of current flowing through said tool rotating motor and having a switch for deenergizing said feed motor when said current reaches said preselected level, and means operated by said sensing device and controlling said feed motor to maintain said resistance below a predetermined level, said means including a timer activated in response to attainment of said preselected current level and operable to disable said feed motor for a preselected time interval after opening of said switch thereby to prevent fluttering of the relay under transient current conditions.

References Cited

UNITED STATES PATENTS

| 2,301,111 | 11/1942 | Cuppers | 51—34 X |
| 2,612,008 | 9/1952 | Kuniholm | 51—290 X |
| 2,780,893 | 2/1957 | Seborg | 51—34 |
| 3,088,250 | 5/1963 | Hold | 51—165 |
| 3,232,008 | 2/1963 | Estabrook | 51—34 |

HAROLD D. WHITEHEAD, *Primary Examiner.*